US007965828B2

(12) United States Patent
Calahan et al.

(10) Patent No.: US 7,965,828 B2
(45) Date of Patent: Jun. 21, 2011

(54) CALL CONTROL PRESENCE

(75) Inventors: Marc Calahan, Woodstock, GA (US); Jamie Richard Williams, Alpharetta, GA (US); Robert John Barnes, Watford Herts (GB)

(73) Assignee: Verint Americas Inc., Roswell, GA (US)

( * ) Notice: Subject to any disclaimer, the term of this patent is extended or adjusted under 35 U.S.C. 154(b) by 113 days.

(21) Appl. No.: 11/608,440

(22) Filed: Dec. 8, 2006

(65) Prior Publication Data
US 2008/0080483 A1 Apr. 3, 2008

Related U.S. Application Data

(60) Provisional application No. 60/848,598, filed on Sep. 29, 2006, provisional application No. 60/848,591, filed on Sep. 29, 2006.

(51) Int. Cl.
H04M 3/42 (2006.01)
(52) U.S. Cl. .............................. 379/201.01; 379/207.02
(58) Field of Classification Search .................. 370/352; 379/221.08, 207.02, 201.01; 455/519, 518
See application file for complete search history.

(56) References Cited

U.S. PATENT DOCUMENTS

| 3,594,919 A | 7/1971 | De Bell et al. |
| 3,705,271 A | 12/1972 | De Bell et al. |
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |

(Continued)

FOREIGN PATENT DOCUMENTS
EP 0453128 A2 10/1991
(Continued)

OTHER PUBLICATIONS

"Customer Spotlight: Navistar International," Web page, unverified print date of Apr. 1, 2002.

(Continued)

Primary Examiner — William J Deane
(74) Attorney, Agent, or Firm — Lawrence A. Aaronson, PC

(57) ABSTRACT

Included are embodiments for detecting presence in a call control protocol environment. At least one embodiment of a method includes subscribing to events associated with a communication system and receiving a notification for an event, the event being associated with a communication between a first communications device and a second communications device.

14 Claims, 12 Drawing Sheets

U.S. PATENT DOCUMENTS

| | | | |
|---|---|---|---|
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,907,680 A | 5/1999 | Nielsen |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,946,375 A * | 8/1999 | Pattison et al. .......... 379/112.01 |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,122,665 A | 9/2000 | Bar et al. |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Purnam et al. |
| 6,301,462 B1 | 10/2001 | Freeman et al. |
| 6,301,573 B1 | 10/2001 | McIlwaine et al. |
| 6,324,282 B1 | 11/2001 | McIlwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,574 B1 | 4/2002 | House et al. |
| 6,404,857 B1 | 6/2002 | Blair et al. |
| 6,411,989 B1 | 6/2002 | Anupam et al. |
| 6,418,471 B1 | 7/2002 | Shelton et al. |
| 6,459,787 B2 | 10/2002 | McIlwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,535,909 B1 | 3/2003 | Rust |
| 6,542,602 B1 | 4/2003 | Elazer |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,606,657 B1 | 8/2003 | Zilberstein et al. |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,724,887 B1 | 4/2004 | Eilbacher et al. |
| 6,738,456 B2 | 5/2004 | Wrona et al. |
| 6,757,361 B2 | 6/2004 | Blair et al. |
| 6,772,396 B1 | 8/2004 | Cronin et al. |
| 6,775,377 B2 | 8/2004 | McIlwaine et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,901,438 B1 | 5/2005 | Davis et al. |
| 6,959,078 B1 | 10/2005 | Eilbacher et al. |
| 6,965,886 B2 | 11/2005 | Govrin et al. |
| 2001/0000962 A1 | 5/2001 | Rajan |
| 2001/0032335 A1 | 10/2001 | Jones |
| 2001/0033644 A1* | 10/2001 | Offer ....................... 379/221.08 |
| 2001/0043697 A1 | 11/2001 | Cox et al. |
| 2002/0038363 A1 | 3/2002 | MacLean |
| 2002/0052948 A1 | 5/2002 | Baudu et al. |
| 2002/0065911 A1 | 5/2002 | Von Klopp et al. |
| 2002/0065912 A1 | 5/2002 | Catchpole et al. |
| 2002/0075880 A1* | 6/2002 | Dolinar et al. ................ 370/401 |
| 2002/0128925 A1 | 9/2002 | Angeles |
| 2002/0143925 A1 | 10/2002 | Pricer et al. |
| 2002/0165954 A1 | 11/2002 | Eshghi et al. |
| 2003/0055883 A1 | 3/2003 | Wiles et al. |
| 2003/0079020 A1 | 4/2003 | Gourraud et al. |
| 2003/0144900 A1 | 7/2003 | Whitmer |
| 2003/0154240 A1 | 8/2003 | Nygren et al. |
| 2004/0100507 A1 | 5/2004 | Hayner et al. |
| 2004/0165717 A1 | 8/2004 | McIlwaine et al. |
| 2004/0235509 A1* | 11/2004 | Burritt et al. .................. 455/519 |
| 2005/0138560 A1 | 6/2005 | Lee et al. |
| 2005/0220039 A1 | 10/2005 | Hoshino et al. |
| 2006/0242232 A1* | 10/2006 | Murillo et al. ................ 709/204 |
| 2007/0036283 A1* | 2/2007 | Shaffer et al. ................. 379/67.1 |
| 2007/0217589 A1* | 9/2007 | Martin et al. ............ 379/202.01 |

FOREIGN PATENT DOCUMENTS

| | | |
|---|---|---|
| EP | 0773687 A2 | 5/1997 |
| EP | 0989720 | 3/2000 |
| GB | 2369263 | 5/2002 |
| WO | WO 98/43380 | 11/1998 |
| WO | WO 00/16207 | 3/2000 |

OTHER PUBLICATIONS

"DKSystems Integrates QM Perception with OnTrack for Training," Web page, unverified print date of Apr. 1, 2002, unverified cover date of Jun. 15, 1999.

"OnTrack Online" Delivers New Web Functionality, Web page, unverified print date of Apr. 2, 2002, unverified cover date of Oct. 5, 1999.

"PriceWaterouseCoopers Case Study" The Business Challenge, Web page, unverified cover date of 2000.

Abstract, net.working: "An Online Webliography," *Technical Training* pp. 4-5 (Nov.-Dec. 1998).

Adams et al., "Our Turn-of-the-Century Trend Watch" *Technical Training* pp. 46-47 (Nov./Dec. 1998).

Barron, "The Road to Performance: Three Vignettes," *Technical Skills and Training* pp. 12-14 (Jan. 1997).

Bauer, "Technology Tools: Just-in-Time Desktop Training is Quick, Easy, and Affordable," *Technical Training* pp. 8-11 (May/Jun. 1998).

Beck et al., "Applications of A1 in Education," *AMC Crossroads* vol. 1: 1-13 (Fall 1996) Web page, unverified print date of Apr. 12, 2002.

Benson and Cheney, "Best Practices in Training Delivery," *Technical Training* pp. 14-17 (Oct. 1996).

Bental and Cawsey, "Personalized and Adaptive Systems for Medical Consumer Applications," Communications ACM 45(5): 62-63 (May 2002).

Benyon and Murray, "Adaptive Systems: from intelligent tutoring to autonomous agents," pp. 1-52, Web page, unknown date.

Blumenthal et al., "Reducing Development Costs with Intelligent Tutoring System Shells," pp. 1-5, Web page, unverified print date of Apr. 9, 2002, unverified cover date of Jun. 10, 1996.

Brusilosy et al., "Distributed intelligent tutoring on the Web," Proceedings of the 8$^{th}$ World Conference of the AIED Society, Kobe, Japan, Aug. 18-22, pp. 1-9 Web page, unverified print date of Apr. 12, 2002, unverified cover date of Aug. 18-22, 1997.

Brusilovsky and Pesin, ISIS-Tutor: An Intelligent Learning Environment for CD/ISIS Users, pp. 1-15 Web page, unverified print date of May 2, 2002.

Brusilovsky, "Adaptive Educational Systems on the World-Wide-Web: A Review of Available Technologies," pp. 1-10, Web Page, unverified print date of Apr. 12, 2002.

Byrnes et al., "The Development of a Multiple-Choice and True-False Testing Environment on the Web," pp. 1-8, Web page, unverified print date of Apr. 12, 2002, unverified cover date of 1995.

Calvi and DeBra, "Improving the Usability of Hypertext Courseware through Adaptive Linking," *ACM*, unknown page numbers (1997).

Coffey, "Are Performance Objectives Really Necessary?" *Technical Skills and Training* pp. 25-27 (Oct. 1995).

Cohen, "Knowledge Management's Killer App," pp. 1-11, Web page, unverified print date of Sep. 12, 2002, unverified cover date of 2001.

Cole-Gomolski, "New Ways to manage E-Classes," *Computerworld* 32(48):4344 (Nov. 30, 1998).

Cross: "Sun Microsystems—the SunTAN Story," Internet Time Group 8 ( © 2001).

Cybulski and Linden, "Teaching Systems Analysis and Design Using Multimedia and Patterns," unknown date, unknown source.

De Bra et al., "Adaptive Hypermedia: From Systems to Framework," *ACM* (2000).

De Bra, "Adaptive Educational Hypermedia on the Web," *Communications ACM* 45(5):60-61 (May 2002).

Dennis and Gruner, "Computer Managed Instruction at Arthur Andersen & Company: A Status Report," *Educational Technical* pp. 7-16 (Mar. 1992).

Diessel et al., "Individualized Course Generation: A Marriage Between CAL and ICAL," *Computers Educational* 22(1/2) 57-65 (1994).

Dyreson, "An Experiment in Class Management Using the World Wide Web," pp. 1-12, Web page, unverified print date of Apr. 12, 2002.

E Learning Community, "Excellence in Practice Award: Electronic Learning Technologies," *Personal Learning Network* pp. 1-11, Web page, unverified print date of Apr. 12, 2002.

Eklund and Brusilovsky, "The Value of Adaptivity in Hypermedia Learning Environments: A Short Review of Empirical Evidence," pp. 1-8, Web page, unverified print date of May 2, 2002.

*e-Learning the future of learning*, THINQ Limited, London, Version 1.0 (2000).

Eline, "A Trainer's Guide to Skill Building," *Technical Training* pp. 34-41 (Sep./Oct. 1998).

Eline, "Case Study: Briding the Gap in Canada's IT Skills," *Technical Skills and Training* pp. 23-25 (Jul. 1997).

Eline "Case Study: IBT's Place in the Sun," *Technical Training* pp. 12-17 (Aug./Sep. 1997).

Fritz, "CB templates for productivity: Authoring system templates for trainers," *Emedia Professional* 10(8):6678 (Aug. 1997).

Fritz, "ToolBook II: Asymetrix's updated authoring software tackles the Web," *Emedia Professional* 10(20): 102106 (Feb. 1997).

Gibson et al., "A Comparative Analysis of Web-Based Testing and Evaluation Systems," pp. 1-8, Web page, unverified print date of Apr. 11, 2002.

Halberg and DeFiore, "Curving Toward Performance: Following a Hierarchy of Steps Toward a Performance Orientation," *Technical Skills and Training* pp. 9-11 (Jan. 1997).

Harsha, "Online Training 'Sprints' Ahead," *Technical Training* pp. 27-29 (Jan./Feb. 1999).

Heideman, "Training Technicians for a High-Tech Future: These six steps can help develop technician training for high-tech work," pp. 11-14 (Feb./Mar. 1995).

Heideman, "Writing Performance Objectives Simple as A-B-C (and D)," *Technical Skills and Training* pp. 5-7 (May/Jun. 1996).

Hollman, "Train Without Pain: The Benefits of Computer-Based Training Tools," pp. 1-11, Web page, unverified print date of Mar. 20, 2002, unverified cover date of Jan. 1, 2000.

Klein, "Command Decision Training Support Technology," Web page, unverified print date of Apr. 12, 2002.

Koonce, "Where Technology and Training Meet," *Technical Training* pp. 10-15 (Nov./Dec. 1998).

Kursh, "Going the distance with Web-based training," *Training and Development* 52(3): 5053 (Mar. 1998).

Larson, "Enhancing Performance Through Customized Online Learning Support," *Technical Skills and Training* pp. 25-27 (May/Jun. 1997).

Linton, et al. "OWL: A Recommender System for Organization-Wide Learning," *Educational Technical Society* 3(1): 62-76 (2000).

Lucadamo and Cheney, "Best Practices in Technical Training," *Technical Training* pp. 21-26 (Oct. 1997).

McNamara, "Monitoring Solutions: Quality Must be Seen and Heard," *Inbound/Outbound* pp. 66-67 (Dec. 1989).

Merrill, "The New Component Design Theory: Instruction design for courseware authoring," *Instructional Science* 16:19-34 (1987).

Minton-Eversole, "IBT Training Truths Behind the Hype," *Technical Skills and Training* pp. 15-19 (Jan. 1997).

Mizoguchi, "Intelligent Tutoring Systems: The Current State of the Art," Trans. IEICE E73(3):297-307 (Mar. 1990).

Mostow and Aist, "The Sounds of Silence: Towards Automated Evaluation of Student Learning a Reading Tutor that Listens" *American Association for Artificial Intelligence*, Web page, unknown date Aug. 1997.

Mullier et al., "A Web base Intelligent Tutoring System," pp. 1-6, Web page, unverified print date of May 2, 2002.

Nash, Database Marketing, 1993, pp. 158-165, 172-185, McGraw Hill, Inc. USA.

Nelson et al. "The Assessment of End-User Training Needs," *Communications ACM* 38(7):27-39 (Jul. 1995).

O'Herron, "CenterForce Technologies CenterForce Analyzer," Web page unverified print date of Mar. 2, 2002, unverified cover date of Jun. 1, 1999.

O'Roark, "Basic Skills Get a Boost," Technical Training pp. 10-13 (Jul./Aug. 1998).

Pamphlet, On Evaluating Educational Innovations[1], authored by Alan Lesgold, unverified cover date of Mar. 5, 1998.

Papa et al., "A Differential Diagnostic Skills Assessment and Tutorial Tool," *Computer Education* 18(1-3):45-50 (1992).

PCT International Search Report, International Application No. PCT/US03/02541, mailed May 12, 2003.

Phaup, "New Software Puts Computerized Tests on the Internet: Presence Corporation announces breakthrough Question Mark™ Web Product," Web page, unverified print date of Apr. 1, 2002.

Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.

Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.
Piskurich, Now-You-See-'Em, Now-You-Don't Learning Centers, *Technical Training* pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," Journal of Instructional Development 7(3): 17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom," *InfoWorld* 20(47):6467 (Nov. 23, 1998).
Unknown Author, "Long-distance learning," *Info World* 20(36):7676 (1998).
Untitled, 10$^{th}$ Mediterranean Electrotechnical Conference vol. 1 pp. 124-126 (2000).
Watson and Belland, "Use of Learner Data in Selecting Instructional Content for Continuing Education," *Journal of Instructional Development* 8(4):29-33 (1985).
Weinschenk, "Performance Specifications as Change Agents," *Technical Training* pp. 12-15 (Oct. 1997).
Witness Systems promotional brochure for eQuality entitled "Bringing eQuality to Business".
Witness Systems promotional brochure for eQuality entitled "Building Customer Loyalty Through Business-Driven Recording of Multimedia Interactions in your Contact Center," (2000).
Aspect Call Center Product Specification, "Release 2.0", Aspect Telecommuications Corporation, May 23, 1998 798.
Metheus X Window Record and Playback, XRP Features and Benefits, 2 pages Sep. 1994 LPRs.
"Keeping an Eye on Your Agents," Call Center Magazine, pp. 32-34, Feb. 1993 LPRs & 798.
Anderson: Interactive TVs New Approach, The Standard, Oct. 1, 1999.
Ante, *Everything You Ever Wanted to Know About Cryptography Legislation. . . (But Were to Sensible to Ask)*, PC world Online, Dec. 14, 1999.
Berst, *It's Baa-aack. How Interative TV is Sneaking Into Your Living Room*, The AnchorDesk, May 10, 1999.

Berst, *Why Interactive TV Won't Turn You on (Yet)*, The AnchorDesk, Jul. 13, 1999.
Borland and Davis, *US West Plans Web Services on TV*, CNETNews.com, Nov. 22, 1999.
Brown, *Let PC Technology Be Your TV Guide*, PC Magazine, Jun. 7, 1999.
Brown, *Interactive TV: The Sequel*, NewMedia, Feb. 10, 1998.
Cline, Déjà vu—*Will Interactive TV Make It This Time Around?*, DevHead, Jul. 9, 1999.
Crouch, *TV Channels on the Web*, PC World, Sep. 15, 1999.
D'Amico, *Interactive TV Gets $99 set-top box*, IDG.net, Oct. 6, 1999.
Davis, *Satellite Systems Gear Up for Interactive TV Fight*, CNETNews.com, Sep. 30, 1999.
Diederich, *Web TV Data Gathering Raises Privacy Concerns*, ComputerWorld, Oct. 13, 1998.
*Digital Broadcasting*, Interactive TV News.
*EchoStar, MediaX Mix Interactive Multimedia With Interactive Television*, PRNews Wire, Jan. 11, 1999.
Furger, *The Internet Meets the Couch Potato*, PCWorld, Oct. 1996.
*Hong Kong Comes First with Interactive TV*, SCI-TECH, Dec. 4, 1997.
*Interactive TV Overview TimeLine*, Interactive TV News.
*Interactive TV Wars Heat Up*, Industry Standard.
Needle, *Will The Net Kill Network TV?* PC World Online, Mar. 10, 1999.
Kane, *AOL-Tivo: You've Got Interactive TV*, ZDNN, Aug. 17, 1999.
Kay, *E-Mail in Your Kitchen*, PC World Online, 093/28/96.
Kenny, *TV Meets Internet*, PC World Online, Mar. 28, 1996.
Linderholm, *Avatar Debuts Home Theater PC*, PC World Online, Dec. 1, 1999.
Mendoza, *Order Pizza WhileYou Watch*, ABCNews.com.
Moody, *WebTV: What the Big Deal?*, ABCNews.com.
Murdorf, et al., *Interactive Television—Is There Life After the Internet?*, Interactive TV News.
Needle, *PC, TV or Both?*, PC World Online.
*Interview with Steve Perlman*, CEO of Web-TV Networks, PC World Online.
Press, *Two Cultures, The Internet and Interactive TV*, Universite de Montreal.
Reuters, *Will TV Take Over Your PC?*, PC World Online.
Rohde, *Gates Touts Interactive TV*, InfoWorld, Oct. 14, 1999.
Ross, *Broadcasters Use TV Signals to Send Data*, PC World Oct. 1996.
Schlisserman, *Is Web TV a Lethal Weapon?*, PC World Online.
Stewart, *Interactive Television at Home: Television Meets the Internet*, Aug. 1998.
Swedlow, *Computer TV Shows: Ready for Prime Time?*, PC World Online.
Wilson, *U.S. West Revisits Interactive TV*, Interactive Week, Nov. 28, 1999.

* cited by examiner

CALL CONTROL PRESENCE

CROSS REFERENCE

This application claims the benefit of U.S. Provisional Application No. 60/848,598, filed Sep. 29, 2006, which is hereby incorporated by reference in its entirety. This application also claims the benefit of U.S. Provisional Application No. 60/848,591, filed Sep. 29, 2006, which is hereby incorporated by reference in its entirety. This application also incorporates by reference U.S. Applications, filed on the same day as the present application, entitled "Call Control Presence and Recording" and "Call Control Recording," respectively.

TECHNICAL FIELD

This disclosure relates to recording capabilities in a communications network. More specifically, this disclosure relates to recording in a Session Initiation Protocol configured network.

BACKGROUND

As communication technologies evolve, the functionality provided to users may improve. More specifically, Time Division Multiplexing (TDM) networks have historically provided communications functionality to call centers and customers. However, the introduction of Voice over Internet Protocol (VoIP) networks and similar technologies have provided the opportunity for call centers to provide improved services to customers, recording of incoming and outgoing communications, and monitoring of the recorded communications. While the utilization of VoIP networks has expanded the capabilities for call centers, VoIP may utilize protocols and technologies that have not historically been utilized. As such, limitations may exist within a VoIP network.

As a nonlimiting example, in many current VoIP environments, recording a communication may include passive taps (passive sniffing), and/or bridge connections. In such configurations, one or more parties may not realize that a recording is taking place. Additionally, determining presence data associated with a user of a communications device in an VoIP environment may be unavailable.

SUMMARY

Included are embodiments for detecting presence in a call control protocol environment. At least one embodiment of a method includes subscribing to events associated with a communication system and receiving a notification for an event, the event being associated with a communication between a first communications device and a second communications device.

Also included are embodiments of a system for detecting presence in a call control protocol environment. At least one embodiment includes a subscribing component configured to subscribe to events associated with a communication system and a receiving component configured to receive a notification for an event, the event being associated with a communication between a first communications device and a second communications device.

Other systems, methods, features, and advantages of this disclosure will be or become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Figure 1:
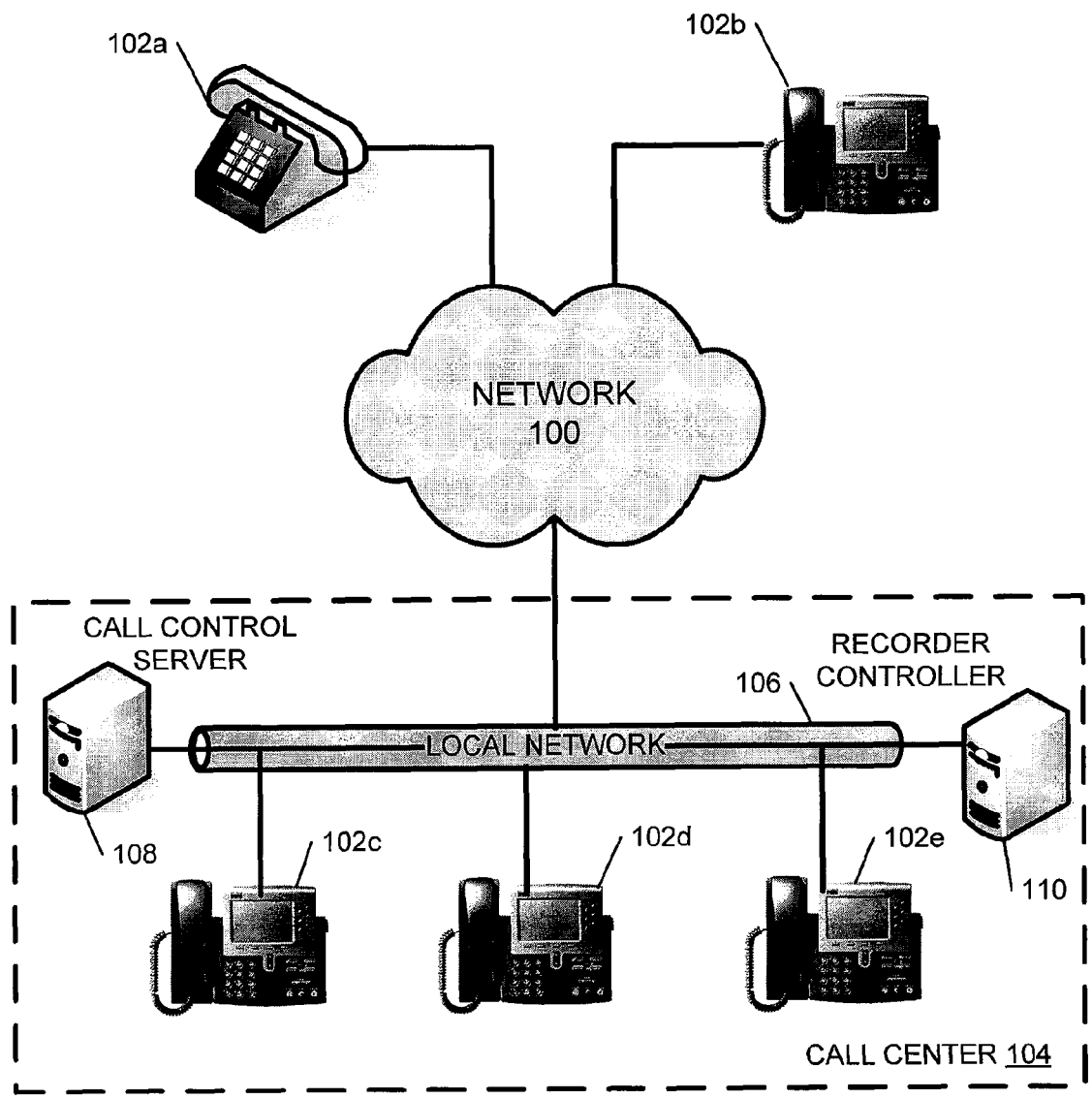
FIG. 1 is an exemplary embodiment of a network configuration for recording a communication between a customer and a call center.

Session Initiation Protocol (SIP) is an application layer control simple signaling protocol for Voice over Internet Protocol (VoIP) implementations. SIP is a textual client-server based protocol that the end user systems and recorder controllers can utilize to provide call forwarding, callee and caller number identification, basic Automatic Call Distribution (ACD) and personal mobility, among others.

SIP addresses may generally take the form of a Uniform Resource Locator (URL). The SIP addresses can be embedded in Web pages and therefore can be integrated as part of implementations such as Click to talk, for example. SIP using simple protocol structure, provides fast operation, flexibility, scalability and multiservice support. SIP provides its own reliability mechanism. SIP creates, modifies and terminates sessions with one or more participants. These sessions include Internet multimedia conferences, Internet telephone calls and multimedia distribution. Members in a session can communicate using multicast or using a mesh of unicast relations, or a combination of these. SIP invitations used to create sessions carry session descriptions, which allow participants to agree on a set of compatible media types.

SIP supports user mobility by proxying and redirecting requests to a user's current location, which may be registered by the user. SIP is not tied to any particular conference control protocol. SIP may be designed to be independent of a low layer transport protocol and can be extended with additional capabilities. SIP transparently supports name mapping and redirection services, allowing the implementation of Integrated Services Digital Network (ISDN) and Intelligent Network telephony subscriber services. These facilities also enable personal mobility that is based on the use of a unique personal identity. SIP supports five facets of establishing and terminating multimedia communications: 1) user location, 2) user capabilities, 3) user availability, 4) call setup, and 5) call handling.

SIP can also initiate multi-party calls using a multipoint control unit (MCU) or fully meshed interconnection instead of multicast. Internet telephony gateways that connect Public Switched Telephone Network (PSTN) parties can also use SIP to set up calls between them. SIP is designed as part of a multimedia data and control architecture currently incorporating protocols, such as Resource Reservation Protocol (RSVP), Real-Time Transport Protocol (RTP), Real-Time Streaming Protocol (RTSP), and Service Advertising Protocol (SAP), among others. However, the functionality and operation of SIP does not depend on any of these protocols. SIP can also be used in conjunction with other call setup and signaling protocols. As such, an end system uses SIP exchanges to determine the appropriate end system address and protocol from a given address that is protocol-independent. As a nonlimiting example, SIP could be used to determine that the party can be reached using H.323, to find the H.245 gateway and user address, and then use H.225.0 to establish the call.

FIG. 1 is an exemplary embodiment of a network configuration for recording a communication between a customer and a call center. More specifically, as illustrated in the nonlimiting example of FIG. 1, communications devices 102a, 102b may be coupled to a network 100. Communications devices 102a, 102b may be IP-based telephones, Public Switched Telephone Network (PSTN) based telephones, cellular telephones, and/or SIP-based telephones. Additionally, network 100 may include one or more networks, such as a PSTN, an IP network (such as the Internet, an Intranet, etc.), a cellular network, an ISDN, and/or other networks.

Also coupled to network 100 is a call center 104. Call center 104 may be coupled to network 100 via local network 106, however this is not a requirement. Call center 106 may be configured to provide customer service to users on communications devices 102a, 102b via agents on communications devices 102c, 102d, and/or 102e. Also coupled to local network 106 is a call control server 108, which may be configured to receive a communication and determine where to route the received communication. Call control server 108 may also include other logic for facilitating communications with call center 104.

Also coupled to local network 106 is a recorder controller 110. Recorder controller 110 may be configured to receive a communication and determine a technique for recording the communication. In the nonlimiting example of FIG. 1, recorder controller 110 includes recording logic for recording a communication between one or more of the communications devices 102c, 102d, and 102e and communications devices 102a and 102b.

Figure 2:
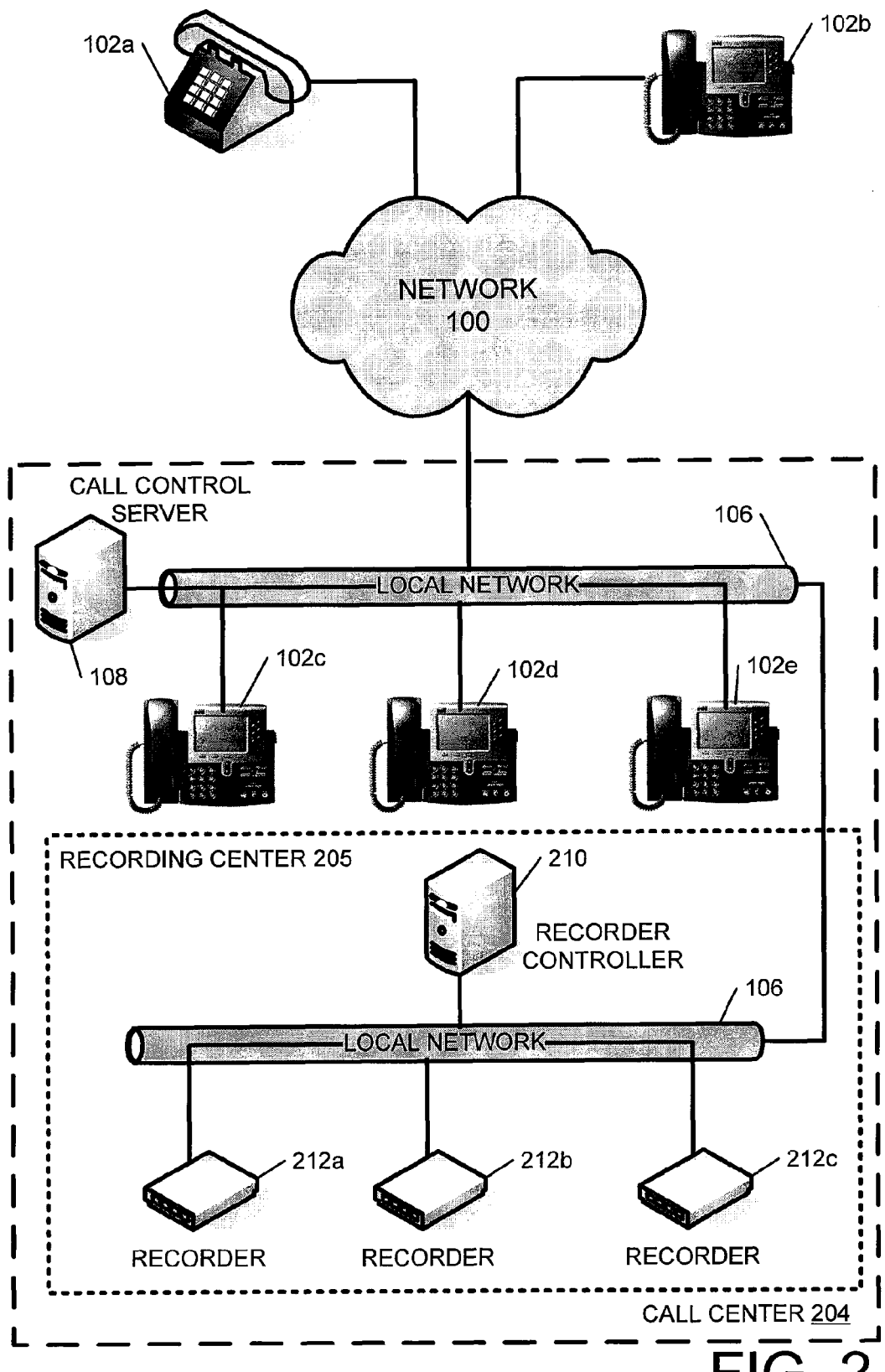
FIG. 2 is an exemplary embodiment of a network configuration for recording a communication between a customer and a call center, utilizing a plurality of recorders.

FIG. 2 is an exemplary embodiment of a network configuration for recording a communication between a customer and a call center, utilizing a plurality of recorders, similar to the network configuration from FIG. 1. More specifically, as illustrated in the nonlimiting example of FIG. 2, communications devices 102a, 102b are coupled to network 100. Also coupled to network 100 is call center 204. Call center 204 may be coupled to network 100 via a local network 106. Local network 106 may be coupled to communications devices 102c, 102d, and 102e, as well as call control center 108.

Also coupled to local network 106 is a recording center 205. Recording center 205 may be configured as a Session Initiation Protocol (SIP) recording center, as discussed in more detail below and may include one or more recorder controllers 210. Recorder controller 210 may include recording logic, as discussed above and/or may include routing logic for receiving data related to a communication and determining which recorder 212a, 212b, and/or 212c to send the data for recording. Recorders 212a, 212b, and 212c may be configured to record data associated with a communication among communications devices 102.

Figure 3:
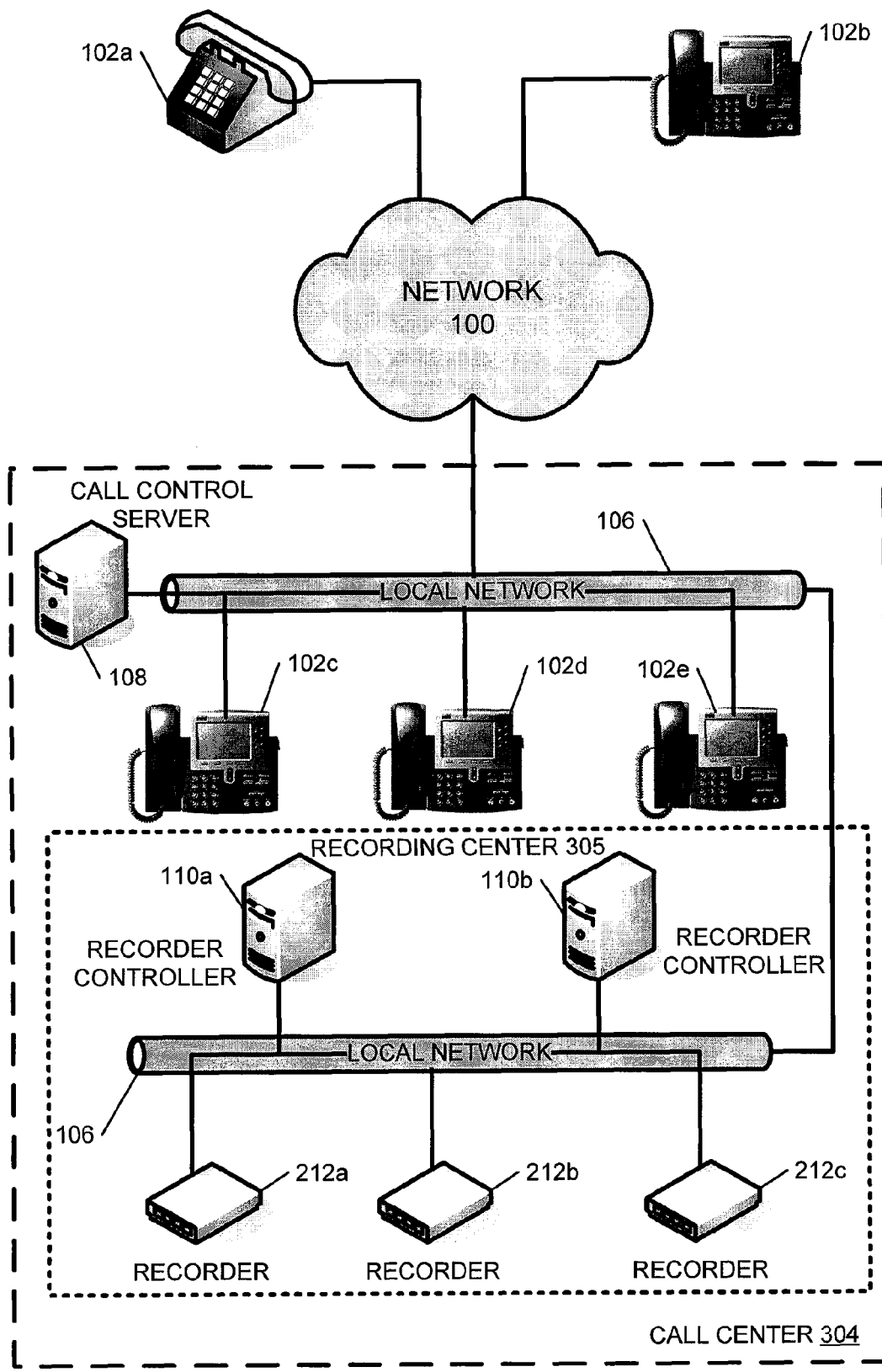
FIG. 3 is an exemplary embodiment of a network configuration for recording a communication, utilizing a plurality of recorder controllers, similar to the configuration from FIG. 2.

FIG. 3 is an exemplary embodiment of a network configuration for recording a communication, utilizing a plurality of recorder controllers. As illustrated in the nonlimiting example of FIG. 3, communications devices 102a, 102b are coupled to network 100. Network 100 is also coupled to call center 304, via local network 106. Local network 106 may also be coupled to components of recording center 305. More specifically, local network 106 may be coupled to recorder controller 110a 110b, as well as recorders 212a, 212b, and 212c. Utilization of a plurality of recorders may provide fail-over protection, load balancing, and/or link protection to the attached recorders, as illustrated in U.S. patent application Ser. No. 11/395,497, filed Mar. 31, 2006 and U.S. patent application Ser. No. 11/394,409, filed Mar. 31, 2006, which are each incorporated by reference in their entireties.

Figure 4:
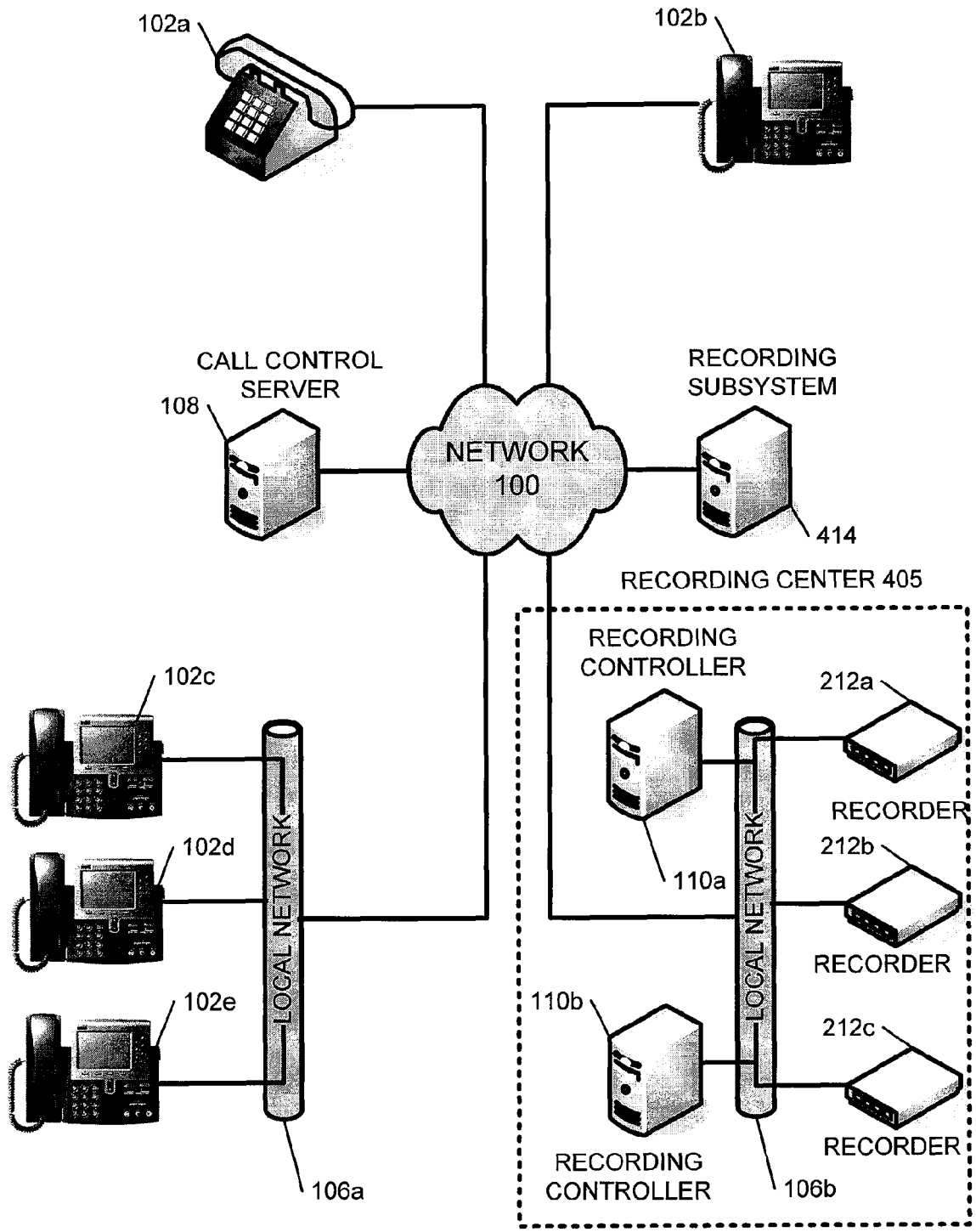
FIG. 4 is an exemplary embodiment of a network configuration for recording a communication, utilizing a distributive network configuration.

FIG. 4 is an exemplary embodiment of a network configuration for recording a communication, utilizing a distributive network configuration, similar to the network configuration from FIG. 3. As illustrated in the nonlimiting example of FIG. 4, communications devices 102a, 102b are coupled to network 100. Also coupled to network 100 re call control server e108 and recording subsystem 414. While recording subsystem is illustrated as being associated with a distributed network configuration, this is a nonlimiting example. More specifically, recording system 414 may be associated with configurations similar to the configurations of FIGS. 1-3. Similarly, while recorder subsystem 414 is illustrated as a separate component, recorder subsystem 414 may be included with the logic of recorder controller 110, and/or be included with one or more other network configurations. Further, recording subsystem 414 may be configured to subscribe to a communications device and/or a system associated with a call center, as discussed in more detail below.

Additionally coupled to network 100 is a local network 106a, which is coupled to agent communications devices 102c, 102d, and 102e. Network 100 is also coupled to recording center 405, via local network 106b. Local network 106b is coupled to a plurality of recorder controllers 110a, 110b, and a plurality of recorders 212a, 212b, and 212c.

One should note that while the nonlimiting example of FIG. 4 illustrates various components coupled to network 100, this is a nonlimiting example. More specifically, depending on the particular embodiment, any configuration of network components can be arranged in a distributed manner. More specifically, in at least one embodiment recording subsystem 414 may be coupled to a local network 106, while one or more recorder controllers 110 may be directly coupled to network 100. Other configurations are also contemplated.

Figures 5A, 5B, 5C, 5D:
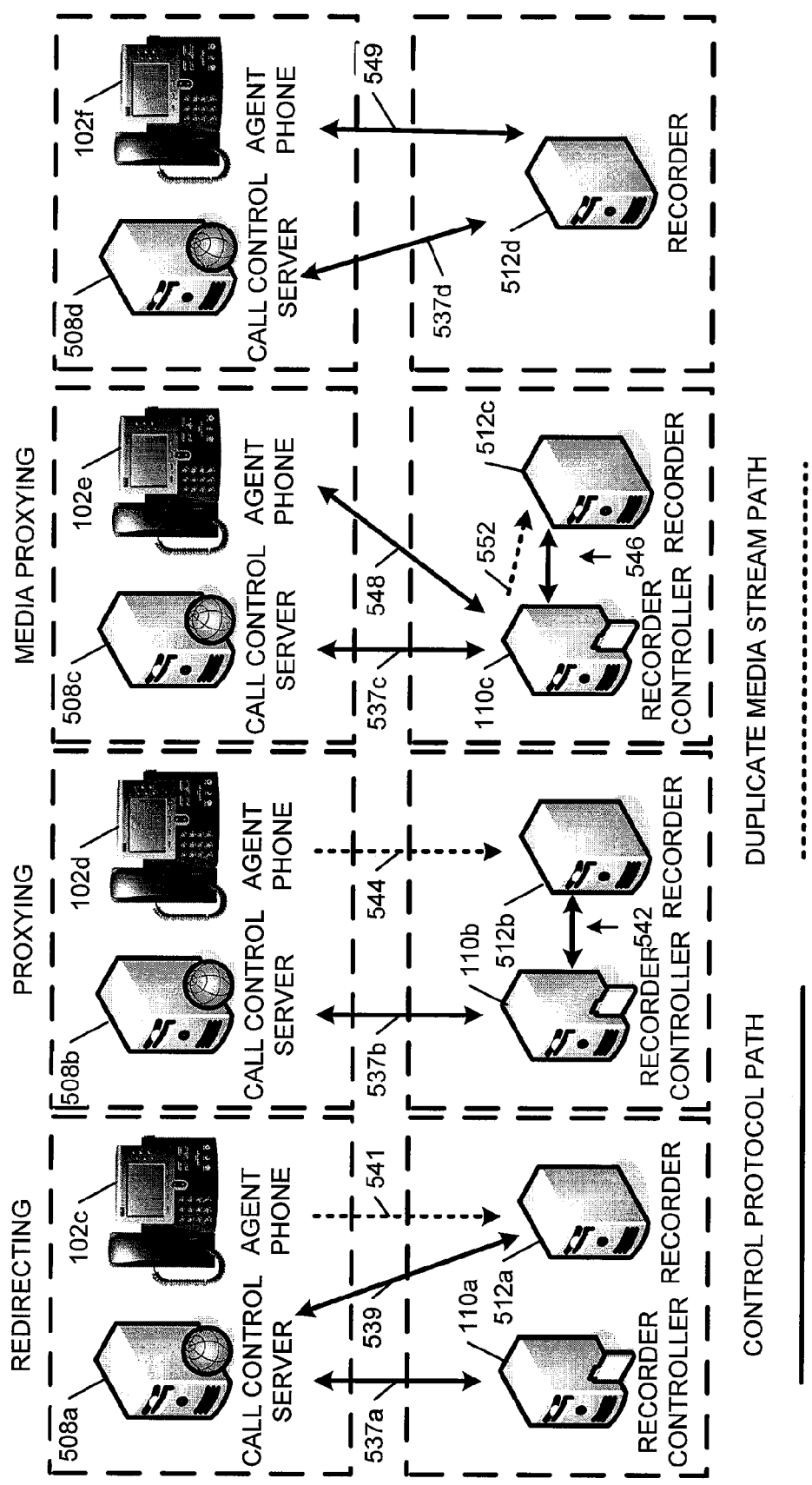
FIG. 5A is an exemplary embodiment of a network configuration illustrating utilization of a proxy.
FIG. 5B is a continuation of the diagram from FIG. 5A.
FIG. 5C is a continuation of the diagram from FIGS. 5A and 5B.
FIG. 5D is a continuation of the diagram from FIGS. 5A-5C.

FIGS. 5A-5C illustrate exemplary call flows for recording one or more duplicated media streams associated with a call using a recorder controller, similar to the diagram from FIG. 4. The call control servers 508a-508d send call requests to recorder controllers 110a-110d and the agent phones 520a-520d to establish dialogs for recording media streams via lines 537a-537d. The two or more duplicated media streams can be sent to a recording system in a single call dialog or as two separate call dialogs. In case of two separate call dialogs, a unique call identification of the original call may be included in the information of the two call dialogs to link the relationship between them.

Referring now to FIG. 5A, the recorder controller 110a instructs the call control server 508a via line 537a to redirect the calls to a recorder 512a. The call control server 508a instructs agent communications device 102c, gateways (not shown), media duplication systems (not shown) and other telephony components to duplicate the media streams and transmit the duplicated media streams to the recorder 512a. The call control server 508a communicates with the recorder 512a to establish a dialog for recording the duplicated media streams via line 539. The agent communications device 120c transmits the duplicated media streams to the recorder 512a via line 541.

Referring to FIG. 5B, the recorder controller 110b proxies the call and directs an agent communications device 120d to send the duplicated media streams directly to recorder 512b. The recorder controller 110b communicates with the recorder 512b to establish a dialog for recording the duplicated media streams via line 542. The call control server 508b instructs with the agent communications device 120d to duplicate the media streams and transmit the duplicated media streams directly to the recorder 512b. The agent communications device 120d transmits the duplicated media streams directly to the recorder 512b via line 544.

Referring to FIG. 5C, the recorder controller 110c proxies the call as well as the duplicated media streams. The recorder controller 110c communicates with the recorder 512c to establish a dialog for recording the duplicated media streams via line 546. The call control server 508c instructs the agent communications device 120e to duplicate the media streams and transmit the duplicated media streams to the recorder controller 110c. The agent communications device 120e transmits the duplicated media streams to the recorder controller 110c via line 548. The recorder controller 110c receives the duplicated media streams and transmits the duplicated media streams to the recorder 512c via line 552.

Referring to FIG. 5D, call control server 508d receives communication data and sends a recording invitation to recorder 512d. Upon receiving the recording invitation, recorder 512d sends data indicating whether recorder 512d is available. If recorder 512d is available, agent communications device 102f sends communications data to recorder 512d. If recorder 512d is not available, call controller 508d may determine another recorder for recording the communication data.

In communicating with recorders (and/or recorder controller), recorder controllers 10 in FIGS. 5A-5D may utilize call control calls such as SIP, H323, etc., which may or may not be the same as the protocol used to communicate with the telephony system. The recorder controller 110 may also use other protocols to communicate with the recorders 512.

Figure 6:
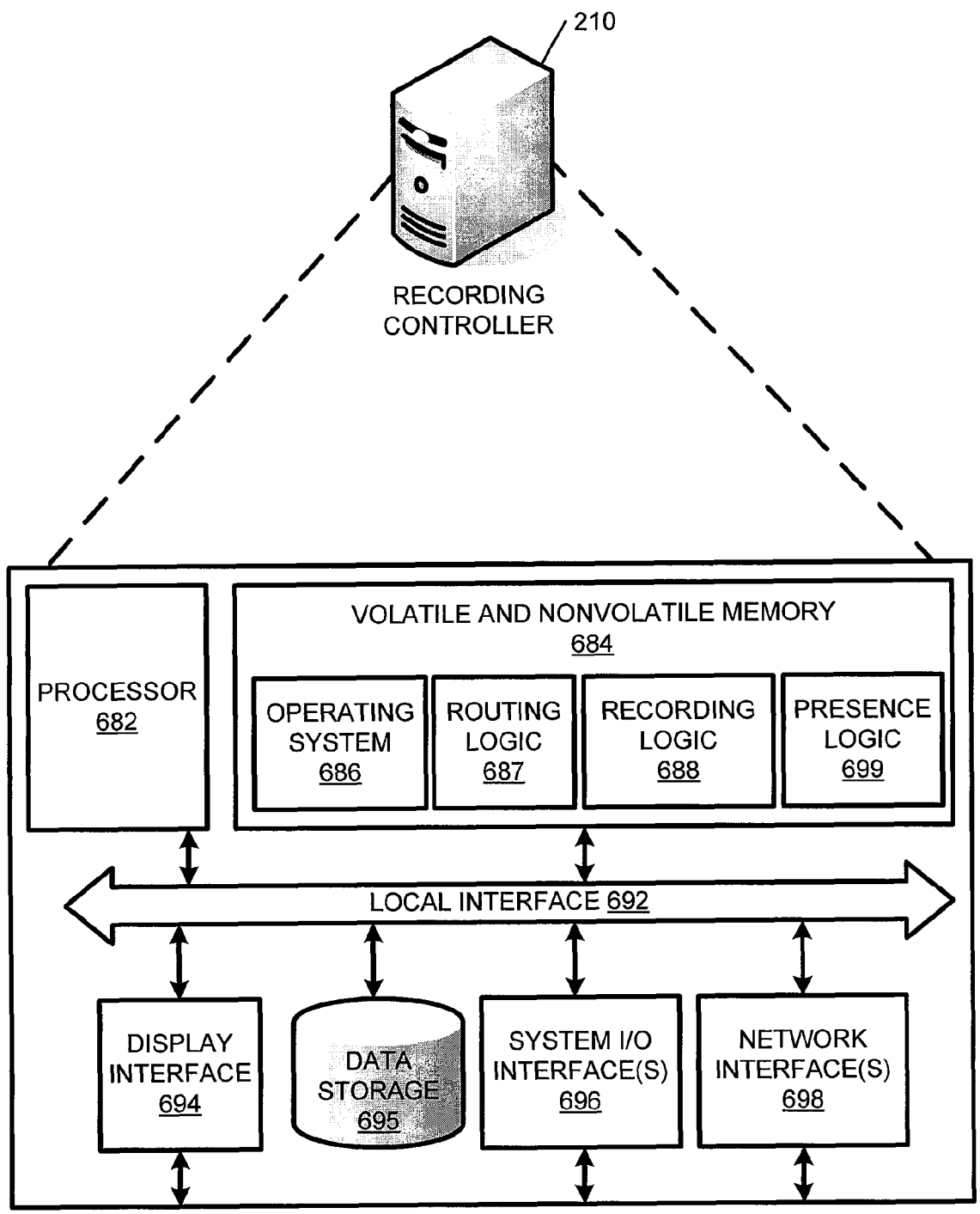
FIG. 6 is a block diagram illustrating an exemplary embodiment of a recorder controller that may be configured to communicate via a communications network such as the networks from FIGS. 1-5.

FIG. 6 is a block diagram illustrating an exemplary embodiment of a recorder controller that may be configured to communicate via a communications network such as the networks from FIGS. 1-5. Although a wire-line client device is illustrated, this discussion can be applied to wireless devices, as well. Generally, in terms of hardware architecture, as shown in FIG. 6, recorder controller 110 includes a processor 682, volatile and nonvolatile memory 684, a display interface 694, data storage 695, one or more input and/or output (I/O) device interface(s) 696, and/or one or more network interface 698 that are communicatively coupled via a local interface 692. The local interface 692 can include, for example but not limited to, one or more buses or other wired or wireless connections. The local interface 692 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 682 may be a device for executing software, particularly software stored in volatile and nonvolatile memory 684.

The processor 682 can be any custom made or commercially available processor, a central processing unit (CPU), an auxiliary processor among several processors associated with the client device 106, a semiconductor based microprocessor (in the form of a microchip or chip set), a macroprocessor, or generally any device for executing software instructions.

The volatile and nonvolatile memory 684 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory 684 may incorporate electronic, magnetic, optical, and/or other types of storage media. One should note that the volatile and nonvolatile memory 684 can have a distributed architecture (where various components are situated remote from one another), but can be accessed by the processor 682. Additionally volatile and nonvolatile memory 684 can include routing logic 687, recording logic 688, presence logic 699, and an operating system 686.

The software in volatile and nonvolatile memory 684 may include one or more separate programs, each of which includes an ordered listing of executable instructions for implementing logical functions. In the example of FIG. 6, the software in the volatile and nonvolatile memory 684 may include routing logic 687, recording logic 688, presence logic 699, as well as operating system 686. The operating system 686 essentially controls the execution of other computer programs and provides scheduling, input-output control, file and data management, memory management, and communication control and related services.

A system component and/or module embodied as software may also be construed as a source program, executable program (object code), script, or any other entity comprising a set of instructions to be performed. When constructed as a source program, the program is translated via a compiler, assembler, interpreter, or the like, which may or may not be included within the volatile and nonvolatile memory 684, so as to operate properly in connection with the operating system 686.

The Input/Output devices that may be coupled to system I/O Interface(s) 696 may include input devices, for example but not limited to, a keyboard, mouse, scanner, microphone, etc. Further, the Input/Output devices may also include output devices, for example but not limited to, a printer, display, speaker, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a media duplication system, a router, etc.

Additionally included are one or more network interfaces 698 for facilitating communication with one or more other devices. More specifically, network interface 698 may include any component configured to facilitate a connection with another device. While in some embodiments, among others, the recorder controller 210 can include a network interface 698 that includes a Personal Computer Memory Card International Association (PCMCIA) card (also abbreviated as "PC card") for receiving a wireless network card, however this is a nonlimiting example. Other configurations can include the communications hardware within the computing device, such that a wireless network card is unnecessary for communicating wirelessly. Similarly, other embodiments include network interfaces 698 for communicating via a wired connection. Such interfaces may be configured with Universal Serial Bus (USB) interfaces, serial ports, and/or other interfaces.

If recorder controller 210 includes a personal computer, workstation, or the like, the software in the volatile and nonvolatile memory 684 may further include a basic input output system (BIOS) (omitted for simplicity). The BIOS is a set of software routines that initialize and test hardware at startup, start the operating system 686, and support the transfer of data among the hardware devices. The BIOS is stored in ROM so that the BIOS can be executed when the client device 106 is activated.

When recorder controller 210 is in operation, the processor 682 may be configured to execute software stored within the volatile and nonvolatile memory 684, to communicate data to and from the volatile and nonvolatile memory 684, and to generally control operations of the client device 106 pursuant to the software. Software in memory, in whole or in part, may be read by the processor 682, perhaps buffered within the processor 682, and then executed.

One should note that while the description with respect to FIG. 6 includes a recorder controller as a single component, this is a nonlimiting example. More specifically, in at least one embodiment, recorder controller 210 can include a plurality of servers, personal computers, and/or other devices. Similarly, while routing logic 687, recording logic 688 and presence logic 699 are each illustrated in FIG. 6 as single software components, this is also a nonlimiting example. In at least one embodiment, presence logic 699 may include one or more components, embodied in software, hardware, and/or firmware. Similarly, routing logic and/or recording logic 688 may include one or more logical components. Additionally, while routing logic 687, presence logic 699, and recording logic 688 are depicted as residing on a single computing device, such as recorder controller 210 may include one or more devices, presence logic 699 may include one or more components residing on one or more different devices.

Similarly, while the discussion with regard to FIG. 6 refers to a recorder controller 210, similar components may also be included in other elements discussed herein. More specifically, a recorder, communications device, recorder controller, call control server, and/or other network elements may include similar components and/or functionality.

The embodiments discussed above may refer to a Session Initiation Protocol (SIP) recording center 405 configured to allow a call center 304 (as well as 104, 204, and 404, collectively referred to as 304) to integrate to a flexible integration point between recordable VoIP resources and the and other components associated with the call center 305. In at least one embodiment, calls directed to a call center 304 can be terminated at the call center 304 and recorded by the by the call center 304. This allows the call center 304 to develop add-ons and duplicate the interactions to a recording system. The recording center 305 can be configured to record all or a subset of interactions and prevent the development of error prone integration points for every call center.

The recording center 305 may be configured to act as a generic SIP endpoint, emulating an SIP phone and/or an SIP trunk. One or more components may be present in at least one embodiment of a recording center 305. First, a recorder 212 that terminates Real Time Protocol (RTP) endpoints to receive audio or other media associated with the communication. Second, a recorder controller 110 may be included and may be responsible for controlling the actions of one or more recorders 212. The recorder controller 110 may be configured to direct the recorders 212 to receive media on open ports, instruct the recorders when to start and stop recordings on those ports, and tag the recording information to the recorders 212 (e.g., associate data with the recording). Third, the recorder controller 110 may also responsible for an SIP stack. The stack may receive SIP "INVITEs," and/or other SIP messages, make internal decisions on whether or not this specific interaction should be recorded, find a recorder which has resources to perform the recording. The stack and control the recording both on the SIP side, as well as the recorder side. Fourth, the recording center 305 may include an application tier that may be configured to provide, at a minimum, applications to search and replay the interactions recorded. An integration framework may also be included and may be responsible for the import of switch data from the call center 304.

One should note that tagging a recording (e.g., associating data with a recording) may be utilized for retrieval and/or replay, such that an administrator (or other party) can find the recording based on the values tagged to the recording. Tagging may be utilized via Calling Line Identifier (CLI), Dialed Number Identification Service (DNIS), queue, agent name, and/or other types of tagging.

Additionally, there may be one or more integration points associated with the call center 304. SIP integration may be a point of integration. SIP integration may be a first integration point that a call center may perform. Depending on the particular configuration, interactions going through the call center 304 may be duplicated since the call center 304 may be configured to provide one or more decision sources for indicating when an interaction is to be recorded. This may be useful, since the call center 304, depending on the particular embodiment, may be encouraged to expose a configuration concerning whether (and/or when) to record a single extension, communication device, group of agents and/or any other business level objects associated with the call center 304.

Another integration point may include an extended tagging integration. This may include a second integration point and may be configured to extend tagging information on the interaction. This integration may be accomplished from the above described integration point and may be configured to provide tagging on integration. More specifically, in at least one embodiment, tagging associated with the "From" party and the "CallId" from the SIP INVITE message may be provided. As described in more detail below, Extended Tagging Integration (ETI) may be configured to provide additional attributes related to the interaction that can be sent to the recording center. In at least one nonlimiting example, the tagging may be sent to the call center, utilizing an "INFO" message. A call center configuration import interface (not shown) may also be included. If attributes are not sent to the call center, an administrators may be required to perform dual maintenance concerning employees and equipment associated with the call center.

The SIP Calls (interactions) between the recording center and the call center 304 may be configured to include one way media traveling from the call center 304 to the recording center. The recording center 305 may be configured to support both recordings with a single stream from the call center and recordings with multiple streams (preferably one stream per party in the initial interaction). In both cases, one or more of the streams may arrive as separate SIP communications.

In the case of a single stream, a single recording SIP communication (interaction) may be setup between the call center 304 and the recording center 305. If there is more than one stream from the call center 304, one or more of the streams may arrive on different SIP Calls (interactions) between the call center 304 and recording center 305. To associate the separate interactions together, a single unique identifier may be utilized for the interactions. This unique identifier may arrive as the value to an "x-callref" tag in the "From" field and/or as an "X-Call-ID" header on the communication. The following examples demonstrate embodiments of a unique identifier:

From "John Doe"<sip:2332@example.com>;
x-callref=12345678 X-Call-ID: 12345678.

In at least one embodiment, the call center may be configured to treat interactions as duplicates of the original interactions and not treat the recording center as a conferenced party. There may be a plurality of reasons for this, one of which may be the desire for the call center to have the ability to implement duplicate media streaming functionality in the handsets, gateways or other systems in the call center.

Additionally, media sessions can be established between the endpoints and the recorders 212 instead of going through central resources, which decreases network utilization. Thus, if the recording session fails, this does not indicate the state of the original interaction should move to a failed state. The recording interaction may be considered as a separate interaction instead of being part of the original interaction since the involved parties should not be aware of the recording session. The recording interaction can be maintained for a specific communications device and/or interaction, even when the interactions themselves are being renegotiated due to a conference, silence suppression, and/or other reason. This means the recording interaction can be setup as a superset of SIP calls between parties.

A recorder can support more concurrent interaction recordings in cases where the default packet size is larger than 20 ms. In at least one embodiment, the parties of the call may notice the quality of the call decreasing when the packet sizes increase. Since the recording center records calls and plays them back at a later time, increasing the packet size may not affect the quality unless there are major network issues. In addition, this may reduce the effect on the network of recording and allow the recorder 212 to handle more concurrent recordings.

Additionally included in this disclosure is an extended tagging integration. The extended tagging integration allows for tagging to be performed on the recording integration. There are some extended SIP headers that may be created to allow this information to be passed from the call center to the recording center. The recording center may be configured to support the following headers:

The X-CallPartyInfo header may be used to convey information about a party in the interaction. The party may be a known (agent or supervisor) or unknown (customer) party. There may be one or more X-CallPartyInfos in an SIP message. A recording interaction with a single mixed stream may include the X-CallPartyInfos for a single SIP Call. A recording interaction with multiple streams (where each stream is treated as a separate SIP Call) may have the X-CallPartyInfos associated with the stream on the specific SIP Call. The value of the X-CallPartyInfo header may contain the display name of the party, the SIP URI (if one exists), and the party's role in the interaction. If the SIP URI is not defined for a party, the SIP URI field will be just "<>". The role may include one or more of the following values: Caller, Called, Observer, Transferred, Conferenced, Consulted, and/or other formats. The format of the X-CallPartyInfo header may include "X-CallPartyInfo:DisplayName<SIP URI>;tag=value". The following are nonlimiting examples using the syntax described above:

X-CallPartyInfo: "John Doe"<sip:2332@example.com>; role=Caller
X-CallPartyInfo: <sip:2332@example.com>
X-CallPartyInfo: <sip:2332@example.com>;role=Called
X-CallPartyInfo: "John Doe"<sip:2332@example.com>
X-CallPartyInfo: "John Doe"<>
X-CallPartyInfo: "John Doe"<>;role=Observer.

The X-CallInfo header may be used to send information about the interaction as a whole. This header may include a set of key-value pairs for each known property of the interaction. Some of these attributes may not make sense at the beginning of the call and/or may be changed during the call. The UAC/call center may then send these attributes using the NFO request or the final BYE request. A recording interaction with multiple SIP calls may have this header on a single SIP Call. The preferable call is the first call setup with the RC.

The following keys may also be associated with the communication data. CLI (Caller Line Information) may represent information about the caller including the address (e.g., URI) from where a customer is calling and the customer's name. In a TDM (Timed-Division Multiplexing) environment, this may include the full 10-digit telephone number (in the United Stated). In a true VoIP environment, the CLI may include the "From" header (Display Name and SIP URI) of the original call.

One should note that the above description is included as a nonlimiting example. More specifically, the description above is used to illustrate the sending of CTI and party information related to a call, and is not necessarily limited to the protocol and/or headers described above.

Another key that may be associated with a communication is a DNIS (Dialed Number Identification Service). The DNIS may include the address first dialed to setup the interaction. "Completion Reason" may also be included. Completion Reason may include a code and/or string indicating why the interaction was stopped. "External Interaction ID" is an external value that can be tagged to interactions that are related. This may cover completely separate recording interactions in the recording center. "Route Point" is a queue on a switch or any directory number the interaction traversed before being routed to the current party. A plurality of keys may exist to indicate a plurality of Route Points the interaction traversed.

"Agent Skill" includes the Skill, Hunt Group, and/or Agent Group that is associated with the call center 304. This would give an indication of why the call was routed to the specific party. "Number Of Holds" may include a count of the number of times this interaction was put on hold. "Number Of Transfers" may include a count of the number of times the remote party was transferred in the call center. "Number Of Conferences" may include a count of the number of times the remote party was conferenced at the call center. "Number Of Parties" may include a total number of parties on the call. This may match the number of X-CallPartyInfo recorders received, however this is not a requirement.

"Call Direction" may be configured to indicate the initial direction of the call. Values associated with call direction may include inbound (an interaction that was received at the call center), outbound (an interaction that is initiated at the call center and is sent to another system), and internal (between two parties on the call center). "Held Time" may include the total amount of time the interaction was on hold. "Interaction Duration" may include the total amount of time of the interaction. The call center 304 may also be configured to send in any custom key to tag other data into the recording center 305. The data may be accessible to the recording center for searching, replay, and business rule evaluations. The format of the X-CallInfo header will be as follows: X-CallInfo: key-value; key=value. A nonlimiting example might include: X-CallInfo:
CLI=7705551212;DNIS=8001234567;RoutePoint=9200;
   RoutePoint=9421;NumberOf  Holds=1;HeldTime=67;
   CallDirection=Inbound;CusomterAccountNumber=87654321; IssueLevel=Severe.

Figure 7:
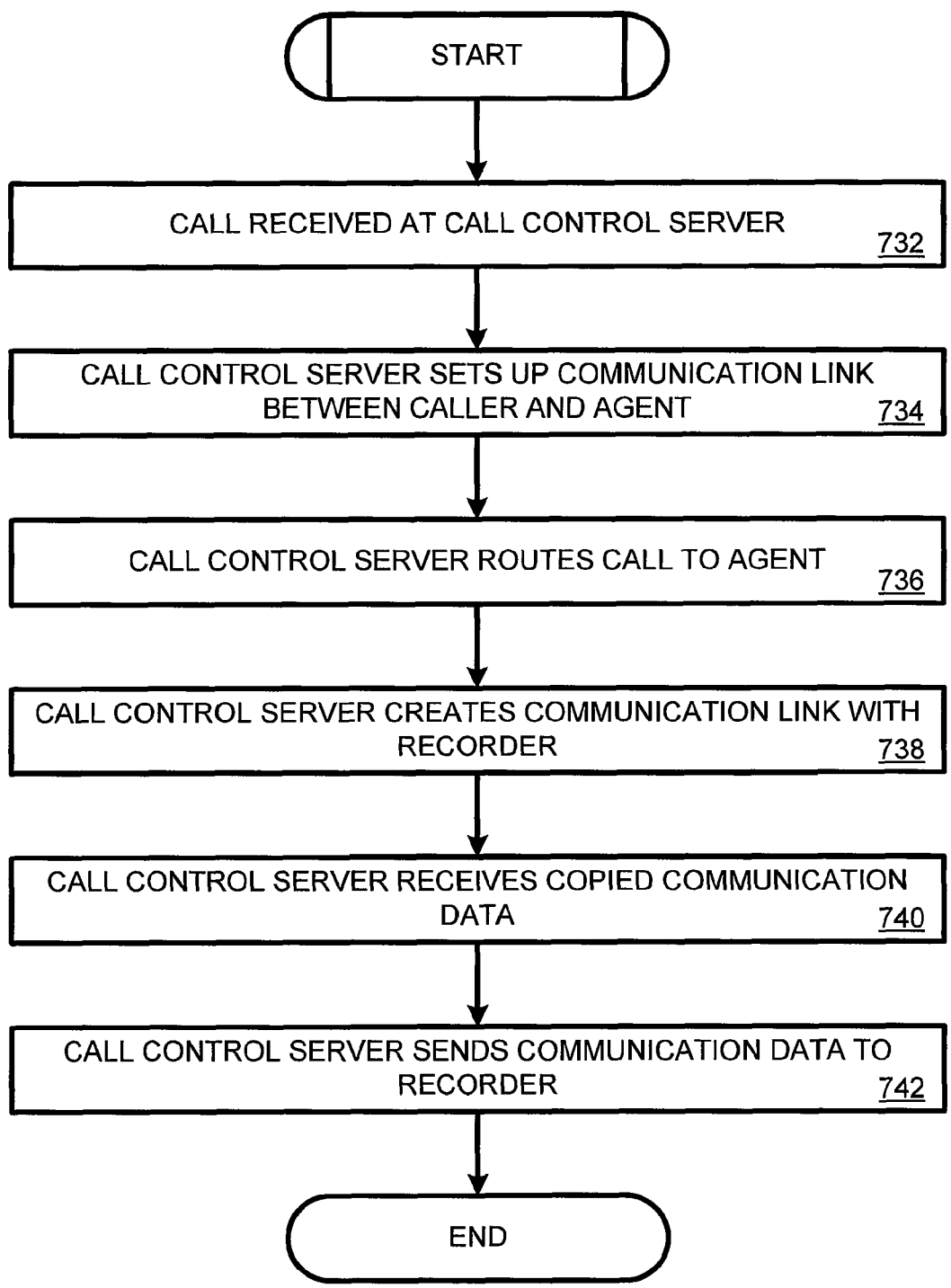
FIG. 7 is a flowchart illustrating an exemplary embodiment of a process that may be utilized to send data to a recorder, such as a recorder in the network configuration from FIG. 1.

FIG. 7 is a flowchart illustrating an exemplary embodiment of a process that may be utilized to send data to a recorder, such as a recorder in the network configuration from FIG. 1. More specifically, as illustrated in the nonlimiting example of FIG. 7, a call can be received at a call control server 108. (block 732) As discussed above, the call control server may be part of a call center 104. The call control server 108 can then set up a communication link between a recorder and an agent associated with a communications device 102 (block 734). The call control server 108 can then route the received call to an agent on a communications device 102 (block 736). The call control server 108 can create a communication link with a recorder (block 738). As discussed above, the communication link may be established via a recorder controller 110, a local network 106, and/or a recorder controller 110.

The call control server 108 may then receive copied communication data from the agent communication device 102 (block 740). More specifically, in at least one embodiment, communication device 102 may include logic for duplicating a media stream associated with a communication. During the communication, communications device 102 can copy (and, depending on the embodiment, manipulate) data associated with the communication and send the copied data to call control serve 108*r*. The copied data may include voice data, video data, and/or other data sent between an agent and a customer. The call control server 108 can then send at least a portion of the received data to a recorder (block 742).

Additionally, as discussed above, the call control server may also be configured to include at least one SIP header with the data sent to a recorder. As such, presence data may be conveyed to an administrator and/or other party. Similarly, some embodiments may be configured such that media may be received from the call control server 508, a gateway, and/or other Voice over Internet Protocol (VoIP) device. Further, some embodiments may be configured such that a gateway may exercise at least a portion of the functionality of the agent communications device.

Figure 8:
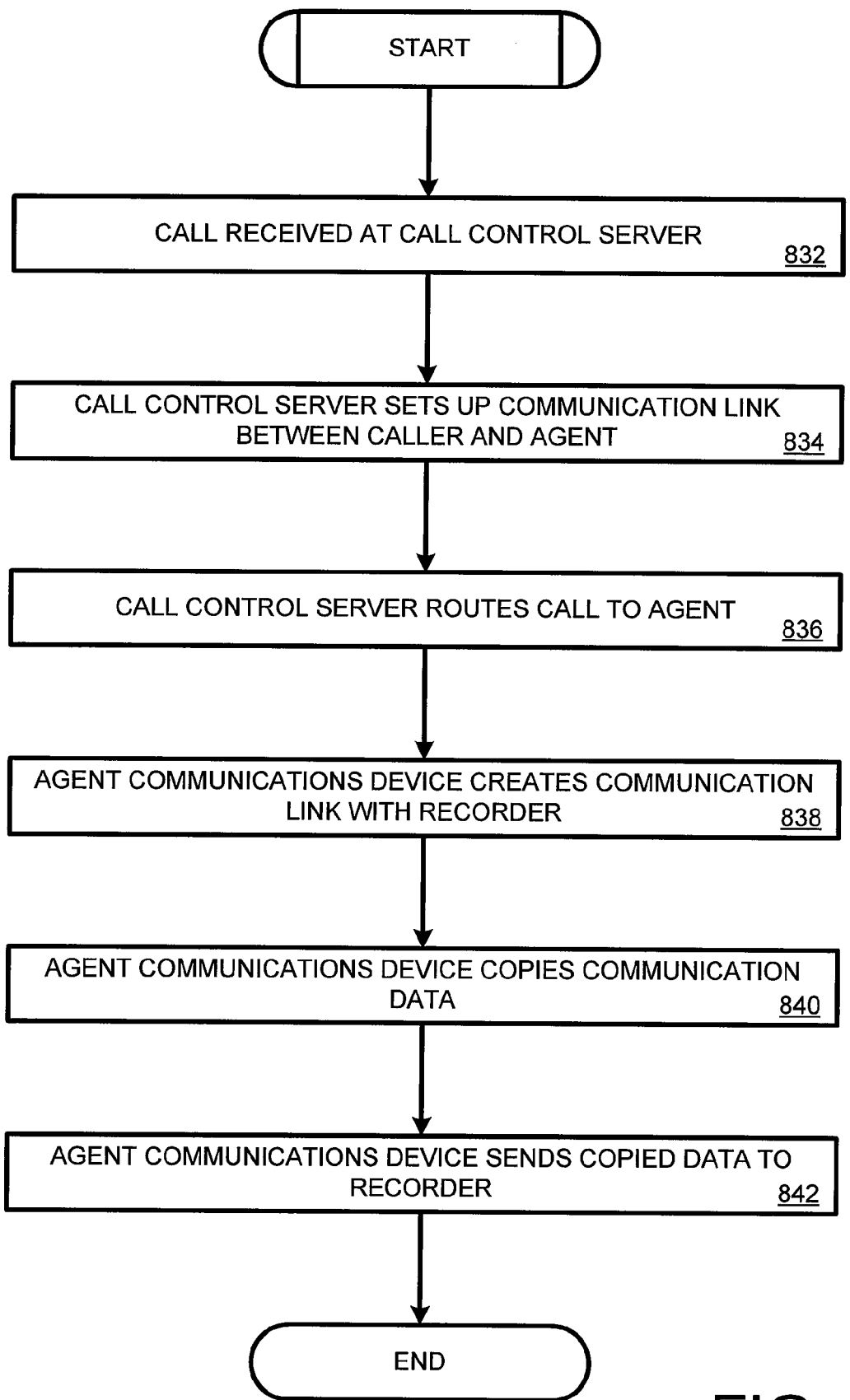
FIG. 8 is a flowchart illustrating an exemplary embodiment of a process that may be utilized to send data from an agent communications device to a recorder.

FIG. 8 is a flowchart illustrating an exemplary embodiment of a process that may be utilized to send data from an agent communications device to a recorder, similar to the flowchart from FIG. 7. As illustrated in the nonlimiting example of FIG. 8, a call can be received at a call control server 108 (block 832). Call control server 108 may set up a communication link between the caller and an agent communication device 102 (block 834). Call control server 108 may then route the call to an agent on a communications device 102 (block 836).

The agent communications device 102 can create a communications link with a recorder 212 (and/or recorder server 110), as shown in block 838. The agent communications device 102 can then copy communication data associated with the current communication (block 840). The agent communications device 102 can then send the copied data to a recorder (block 842).

As discussed above, the agent communications device 102 can include with the copied data SIP header data to be sent to the recorder 212 (and/or recorder server 110). The header data may be configured to provide data to a recorder, an administrator, and/or other party.

Additionally, as discussed above, upon receiving the copied data, the recorder controller 110 may be configured to determine recorder bandwidth, recorder capabilities, and other data to determine a desired recorder to send the received data. Additionally, in configurations with a plurality of recorder controllers 110, the communications device 102 can determine which recorder controller 110 to send copied data.

Figure 9:
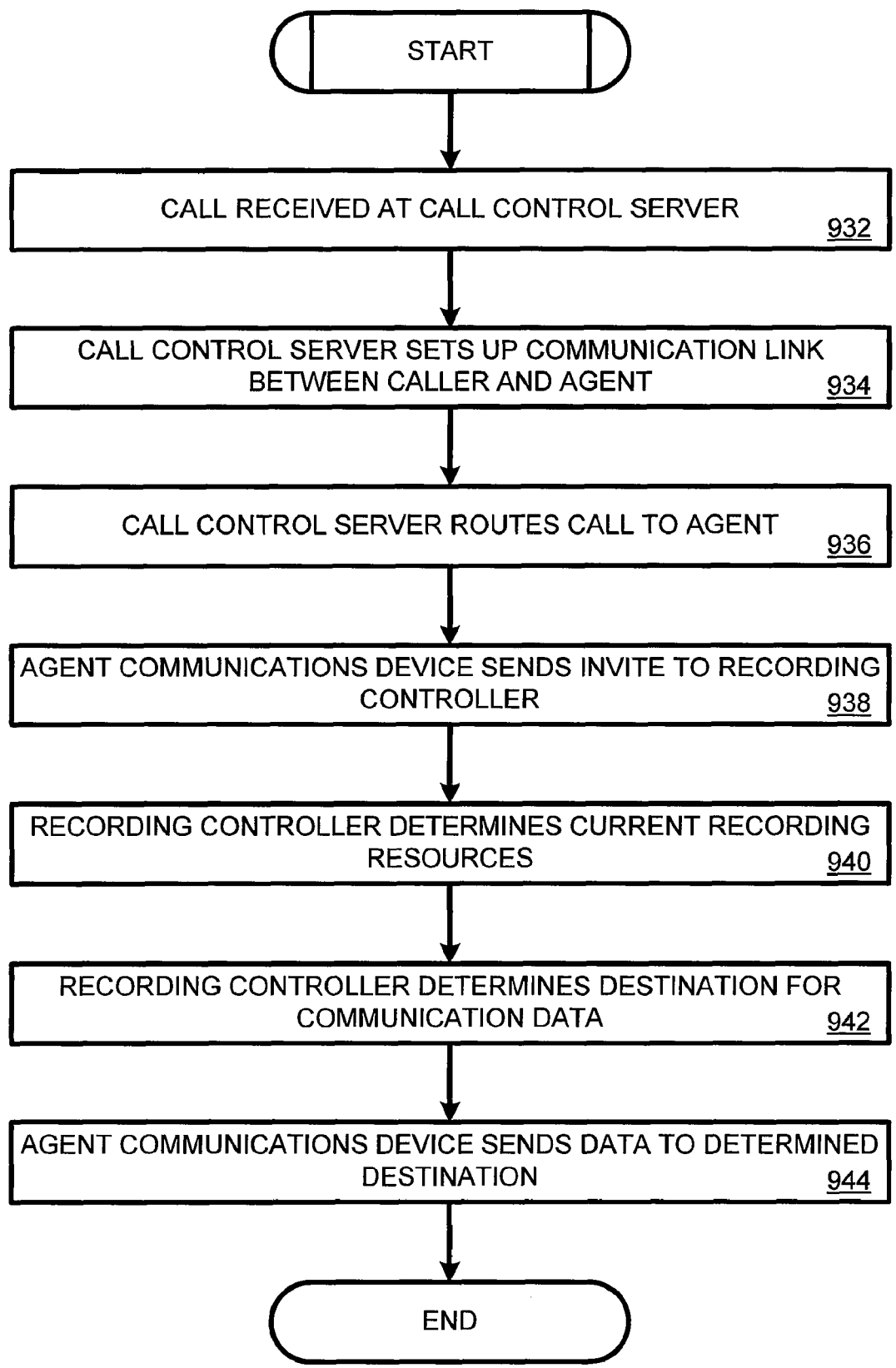
FIG. 9 is a flowchart illustrating an exemplary embodiment of a process that may be utilized to communicate with a recorder controller.

FIG. 9 is a flowchart illustrating an exemplary embodiment of a process that may be utilized to communicate with a recorder controller, similar to the flowchart from FIG. 8. More specifically, as illustrated in the nonlimiting example of FIG. 9, a call may be received at a call control server 108 (block 932). Call control server 108 can then set up a communication link between the caller and an agent (block 936). Agent communications device 102 can send an invite to recorder controller 110 (block 938). Recorder controller 110 can determine the current recording resources (block 940). More specifically, in at least one nonlimiting example, recorder controller 110 can communicate with one or more recorders 212 to determine current ability for a recorder to receive data associated with the current communication. Recorder controller 110 can then determine a destination for the data associated with the current communication (block 942). Agent communications device 102 can then send data to the determined destination (block 944).

Figure 10:
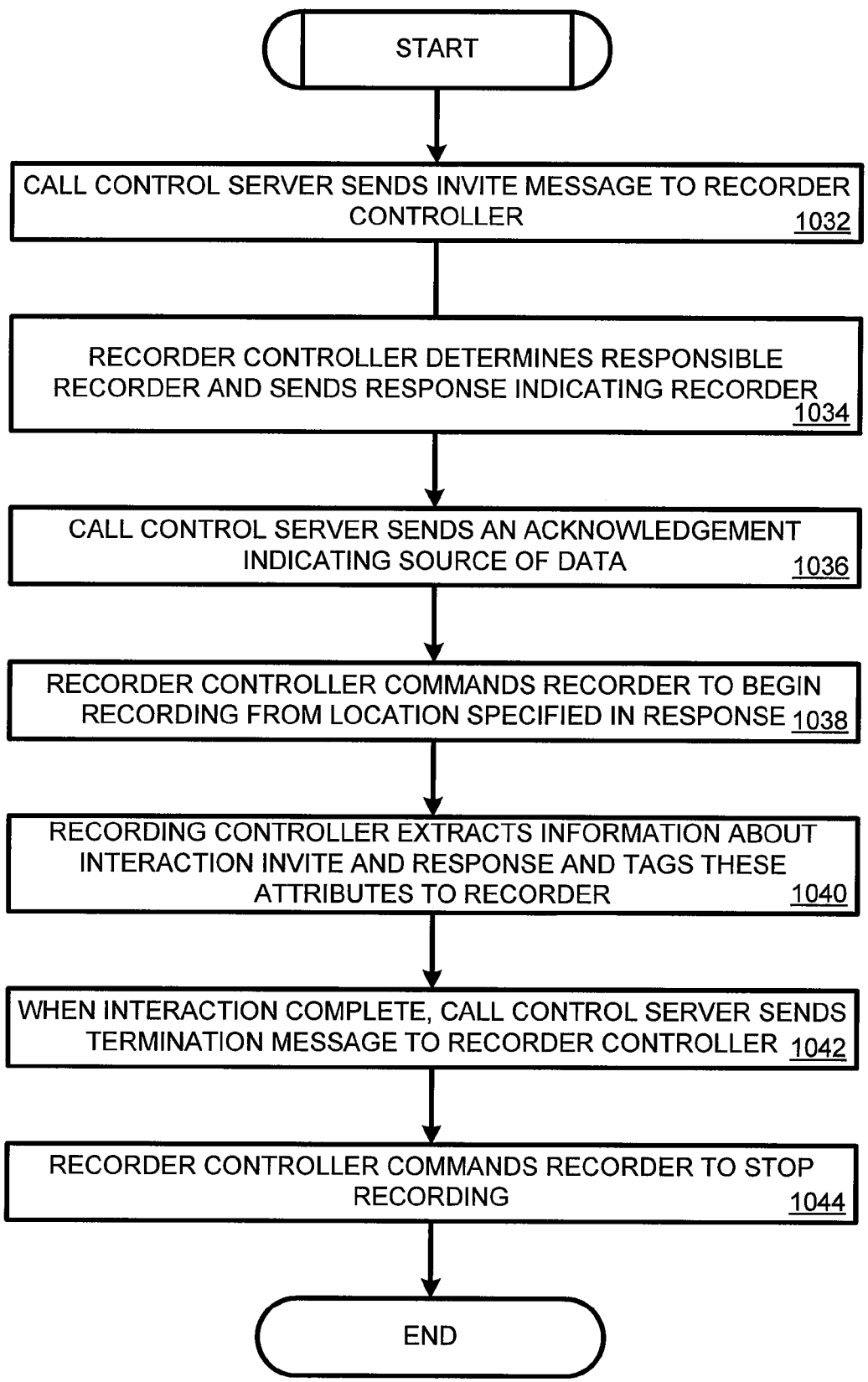
FIG. 10 is a flowchart illustrating an exemplary embodiment of a process for a recorder controller to facilitate recording of a communication.

FIG. 10 is a flowchart illustrating an exemplary embodiment of a process for a recorder controller to facilitate recording of a communication. As illustrated in the nonlimiting example of FIG. 10, call control server 108 can send an invite message to a recorder controller 110 (block 1032). Recorder controller 110 determines a responsible recorder and sends a response indicating the determined recorder (block 1034). Call control server 108 sends an acknowledgement indicating the source of the data (block 1036). Recorder controller 110 can command a recorder 212 to begin recording from the location specified in the response (block 1038). Recorder controller 110 can then extract information related to the interaction invite and interaction response (e.g., data related to the communication between an agent and a customer), and tag these attributes into a header that may be sent to the recorder, as shown in block 1040. When the interaction (e.g., communication) is complete, call control server 108 may send a termination message to recorder controller 110 (block 1042). Recorder controller 110 can then command recorder 212 to stop recording.

Figure 11:
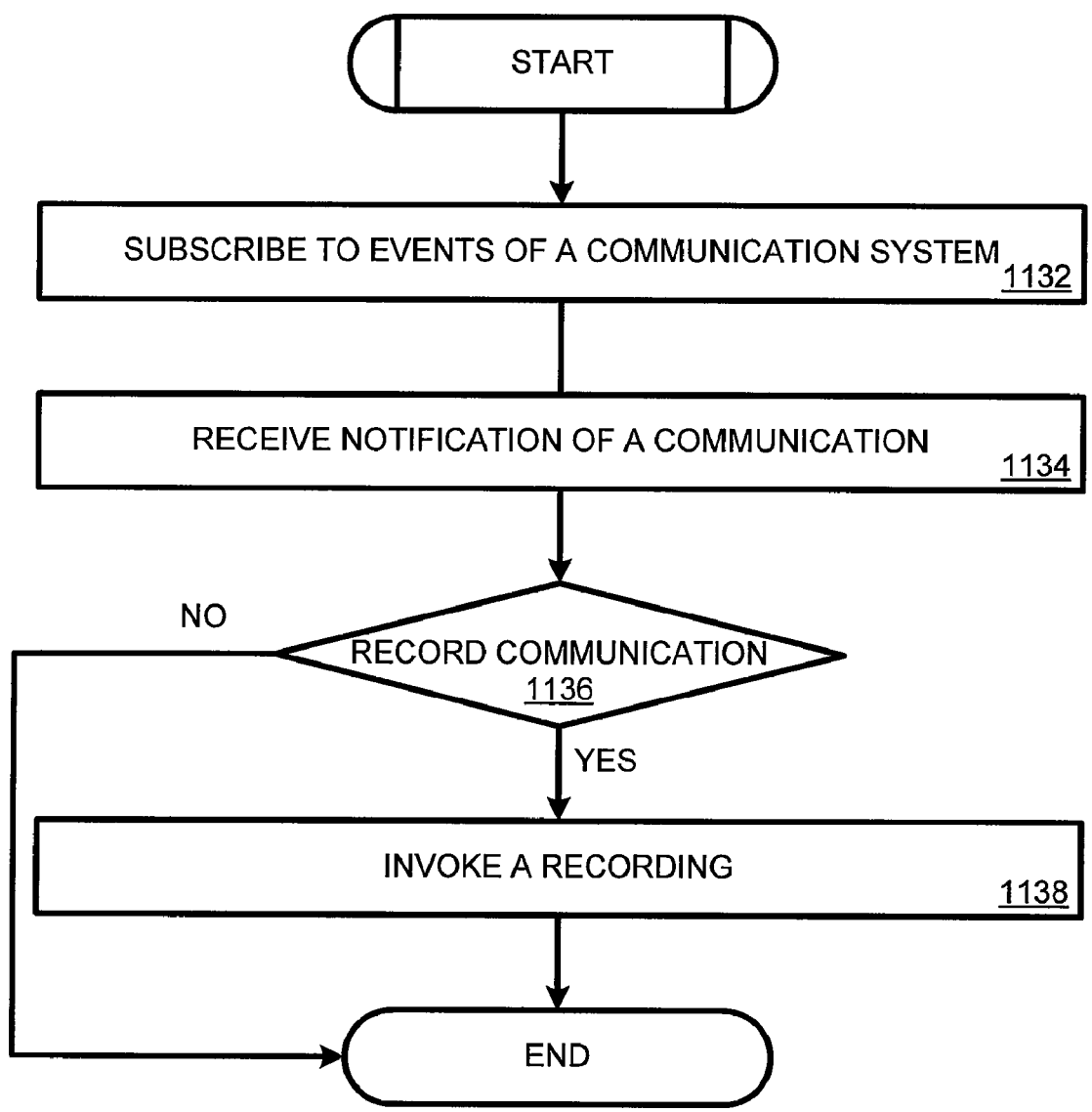
FIG. 11 is a flowchart illustrating an exemplary embodiment of a process for utilizing tagging data to invoke a recording.

FIG. 11 is a flowchart illustrating an exemplary embodiment of a process for utilizing tagging data to invoke a recording. As illustrated in the nonlimiting example of FIG. 11, a recorder subsystem 414 may subscribe to events of a communication system (block 1132). More specifically, in at least one nonlimiting example, recorder subsystem 414 (which may be included with recorder controller 110) may be configured to receive notification associated with a particular communication device, a plurality of communications devices, a call center, and/or other network components. The notification can be facilitated by the call control server 108 and/or recorder controller 110 and may be facilitated via header data associated with a communication.

Recorder subsystem 414 can then receive a notification associated with a communication (block 1134). Recorder subsystem 414 can then determine whether to record the communication (block 1136). If recorder subsystem determines to record the communication, recorder subsystem can invoke a recording (block 1138).

One should note that utilization of header data, as discussed above can facilitate invocation of a recording. More specifically, while in many nonlimiting examples, a communications device sends a request for a recording, in this nonlimiting example, recorder subsystem 414 actively invokes a recording according to one or more received SIP headers. As such, the recording subsystem 414, recorder controller 110, and/or other components of a recording center 305, may have greater control of recording capabilities.

Figure 12:
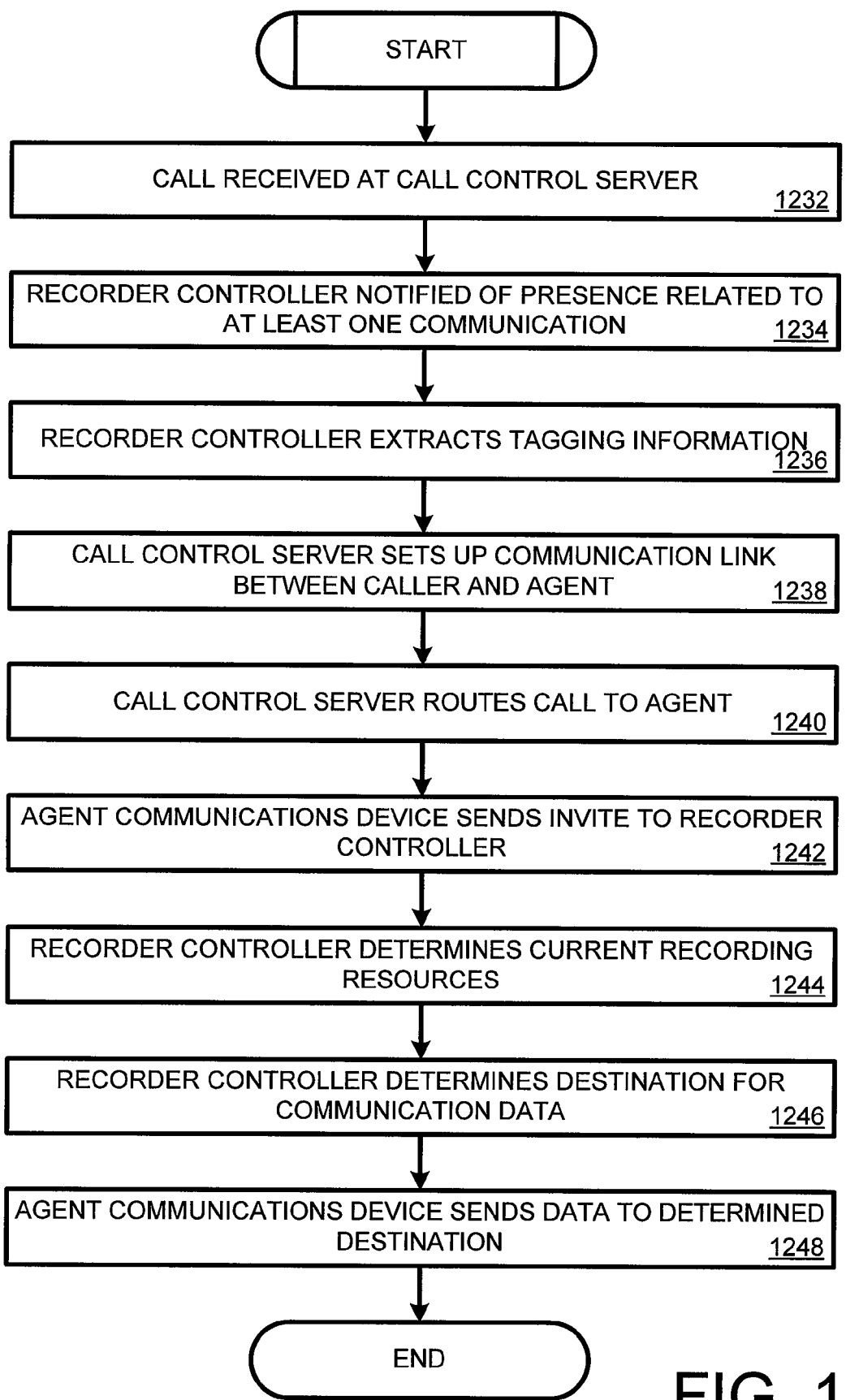
FIG. 12 is a flowchart illustrating an exemplary embodiment of a process for utilizing tagging data from a control server, similar to the diagram from FIG. 11.

FIG. 12 is a flowchart illustrating an exemplary embodiment of a process for utilizing tagging data from a control server, similar to the diagram from FIG. 11. More specifically, as illustrated in the nonlimiting example of FIG. 12, a call is received at a call control server 108 (block 1232). Recorder controller 110 may then be notified of presence data related to at least one communication controlled by the call control server e108 (block 1234).

Recorder controller 108 may extract tagging information associated with the presence data (block 1236). Call control server 108 can set up a communications link between a caller and an agent (block 1238). Call control server 108 can then route the received call to the agent (block 1240). A communications device 102 associated with the agent then sends an invite to recorder controller 108 (block 1242). Recorder controller 110 can then determine current recording resources (block 1244). Recorder controller 110 may determine a destination for the communications data (block 1246). Agent communications device 102 then sends data to the determined destination (block 1248).

One should note that, in at least one exemplary embodiment determining whether the record data associated with a communication may depend, at least in part, on business rules of the customer center, customer, and/or other entity. As a nonlimiting example, a business rule may include a rule to record all calls, record calls longer than a predetermined duration, shorter than a predetermination, calls between certain parties, and/or other business rules.

Similarly, embodiments of the process described in FIG. 12 may also include subscribing to events associated with one or more device in a communications system and/or subscribing to events associated with the communications system, as a whole. In this nonlimiting example, the recorder controller 110 may be notified of communications associated with these subscriptions.

Additionally, a customer center may include, but is not limited to, outsourced contact centers, outsourced customer relationship management, customer relationship management, voice of the customer, customer interaction, contact center, multi-media contact center, remote office, distributed enterprise, work-at-home agents, remote agents, branch office, back office, performance optimization, workforce optimization, hosted contact centers, and speech analytics, for example.

Additionally included in this disclosure are embodiments of integrated workforce optimization platforms, as discussed in U.S. application Ser. No. 11/359,356, filed on Feb. 22, 2006, entitled "Systems and Methods for Workforce Optimization," which is hereby incorporated by reference in its entirety. At least one embodiment of an integrated workforce optimization platform integrates: (1) Quality Monitoring/Call Recording-voice of the customer; the complete customer experience across multimedia touch points; (2) Workforce Management-strategic forecasting and scheduling that drives efficiency and adherence, aids in planning, and helps facilitate optimum staffing and service levels; (3) Performance Management-key performance indicators (KPIs) and scorecards that analyze and help identify synergies, opportunities and improvement areas; (4) e-Learning—training, new information and protocol disseminated to staff, leveraging best practice customer interactions and delivering learning to support development; and/or (5) Analytics—deliver insights from customer interactions to drive business performance. By way of example, the integrated workforce optimization process and system can include planning and establishing goals—from both an enterprise and center perspective-to ensure alignment and objectives that complement and support one another. Such planning may be complemented with forecasting and scheduling of the workforce to ensure optimum service levels. Recording and measuring performance may also be utilized, leveraging quality monitoring/call recording to assess service quality and the customer experience.

The embodiments disclosed herein can be implemented in hardware, software, firmware, or a combination thereof. At least one embodiment, disclosed herein is implemented in software and/or firmware that is stored in a memory and that is executed by a suitable instruction execution system. If implemented in hardware, as in an alternative embodiment embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A method for detecting presence in a Voice over Internet Protocol communications system environment, comprising:
   subscribing to receive an indication related to events associated with a communication system, the events being subscribed to by a recorder controller;
   receiving a notification for an event, the event being associated with a communication between a first communications device and a second communications device and the notification being facilitated by an extraction of tagging data associated with presence data from the communication between the first device and the second communications device, the extraction including information related to an interaction invite and an interaction response;
   placing the tagging data into a Session Initiation Protocol (SIP) header of the communication;
   receiving a request from the second communications device at the recorder controller to determine recording resources to record at least a portion of the communication in response to the notification; and
   recording the portion of the communication having the Session Initiation Protocol (SIP) header based on information contained in Session Initiation Protocol (SIP) header of the portion of the communication.

2. The method of claim 1, wherein subscribing to events associated with a communications system includes subscribing to events associated with a communications device.

3. The method of claim 1, further comprising, in response to determining to invoke a recording of the interaction, invoking a recording of the interaction.

4. The method of claim 1, wherein the notification includes presence data associated with the first communication device.

5. The method of claim 1, wherein the notification includes presence data associated with the first communications device and the second communications device.

6. The method of claim 1, wherein invoking a recording includes determining at least one recorder for recording by the recorder controller.

7. A system for detecting presence in a Voice over Internet Protocol call control protocol environment, comprising:
   a subscribing component configured to subscribe to events associated with a communication device;
   a receiving component configured to receive a notification for an event, the event being associated with a communication between a first communications device and a second communications device and the notification being facilitated by an extraction of tagging data associated with presence data from the communication between the first device and the second communications device, the extraction including information related to an interaction invite and an interaction response, receiving component further placing the tagging data into a Session Initiation Protocol (SIP) header of the communication; and
   a determining component configured to determine whether to invoke a recording of the event in response to the notification from the second communications device, the recording being performed based on the information contained in the Session Initiation Protocol (SIP) header of the communication.

8. The system of claim 7, wherein the determining component is configured to determine whether to invoke a recording of the event based on at least one business rule.

9. The system of claim 7, further comprising an invoking component configured to, in response to determining to invoke a recording of the event, invoke a recording of the event.

10. The system of claim 7, wherein the subscribing component is further configured to subscribe to events associated with a communications device.

11. The system of claim 7, wherein the notification includes presence data associated with the first communication device.

12. The system of claim 7, wherein the notification includes presence data associated with the first communications device and the second communications device.

13. The system of claim 7, wherein the notification is received in a Session Initiation Protocol (SIP) format.

14. The system of claim 7, wherein the invoking component is further configured to determine at least one recorder for recording.

* * * * *